(12) United States Patent
Sun et al.

(10) Patent No.: US 11,874,830 B2
(45) Date of Patent: Jan. 16, 2024

(54) EFFICIENT JOB WRITING FOR DATABASE MEMBER

(71) Applicant: International Business Machines Corporation, Armonk, NY (US)

(72) Inventors: Sheng Yan Sun, Beijing (CN); Hong Mei Zhang, Haidian District (CN); Meng Wan, Beijing (CN); Peng Hui Jiang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/654,110

(22) Filed: Mar. 9, 2022

(65) Prior Publication Data

US 2023/0289342 A1    Sep. 14, 2023

(51) Int. Cl.
*G06F 16/2453* (2019.01)
*G06F 16/242* (2019.01)
*G06F 11/34* (2006.01)
*G06F 16/23* (2019.01)

(52) U.S. Cl.
CPC .... *G06F 16/24542* (2019.01); *G06F 11/3409* (2013.01); *G06F 16/2386* (2019.01); *G06F 16/2433* (2019.01)

(58) Field of Classification Search
None
See application file for complete search history.

(56) References Cited

U.S. PATENT DOCUMENTS

| 6,233,585 B1 | 5/2001 | Gupta | |
| 10,055,262 B1* | 8/2018 | Thomas | G06F 9/5083 |
| 2006/0059253 A1* | 3/2006 | Goodman | G06Q 10/10 709/223 |
| 2011/0088043 A1 | 4/2011 | Lind | |
| 2011/0153566 A1 | 6/2011 | Larson | |

OTHER PUBLICATIONS

"Scaling and Parallel Processing", Spring, Printed Nov. 20, 2021, 7 pages, <https://docs.spring.io/spring-batch/docs/current/reference/html/scalability.html>.
Kingsbury et al., "Elle: Inferring Isolation Anomalies from Experimental Observations", arXiv, Cornell University, Mar. 23, 2020, 14 pages, <https://arxiv.org/pdf/2003.10554.pdf>.
Tomar et al., "Job Scheduling with Spring Batch", InnovationM Blog, Mar. 16, 2018, 7 pages, <https://innovationm.co/job-scheduling-with-spring-batch/>.

* cited by examiner

*Primary Examiner* — Tuankhanh D Phan
(74) *Attorney, Agent, or Firm* — Gavin Giraud

(57) ABSTRACT

In a computer-implemented method for improving performance of a database, a processor receives batch jobs for a relational database. The batch jobs may include a first member with a first buffer pool, and a second member with a second buffer pool. The processor may also identify a first actual object and an isolation level for the batch jobs, generate related queries based on the first actual object and the isolation level, calculate a cost for the first member and the second member to run the batch jobs based on the related queries, and assign the batch jobs to the first member based on a lower calculated cost.

20 Claims, 6 Drawing Sheets

EFFICIENT JOB WRITING FOR DATABASE MEMBER

BACKGROUND

The present invention relates generally to the field of database optimization, and more particularly to generating additional and alternative access paths to optimize retrieval of data within a database.

In certain database types, a database system chooses an "access path" to retrieve data after a batch job (e.g., structured query language (SQL) request) is executed. The database system receives a batch job that, for example, requests at least one variable to be filled up with one or more values. The variable may include a few thousand rows/cells from among tens of thousands of rows/cells within the database (i.e., a database table). The database system estimates a filter factor using the determined value for the variable, and selects an access path to retrieve the data.

The database system can hamper the overall performance of the system by selecting an inefficient or resource-intensive access path. A complex query may require the database system to search for many variables that can be matched to many different records on separate tables. This may be especially true in relational databases, which are still used to store valuable data and are becoming more and more complex to deal with as other types of databases increase in use. Some complex applications involve a variety of job systems to service database activities. These job systems/databases use parallel jobs to increase the speed of servicing these applications, but performance is still an issue in many cases.

SUMMARY

Aspects of one embodiment of the present invention disclose a computer-implemented method, a computer program product, and a computer system for improving performance of a database. A processor receives batch jobs for a relational database comprising (i) a first member comprising a first buffer pool, and (ii) a second member comprising a second buffer pool, identifies a first actual object and an isolation level for the batch jobs, generates related queries based on the first actual object and the isolation level, calculates a cost for the first member and the second member to run the batch jobs based on the related queries, and assigns the batch jobs to the first member based on a lower calculated cost.

DETAILED DESCRIPTION

Figure 1:
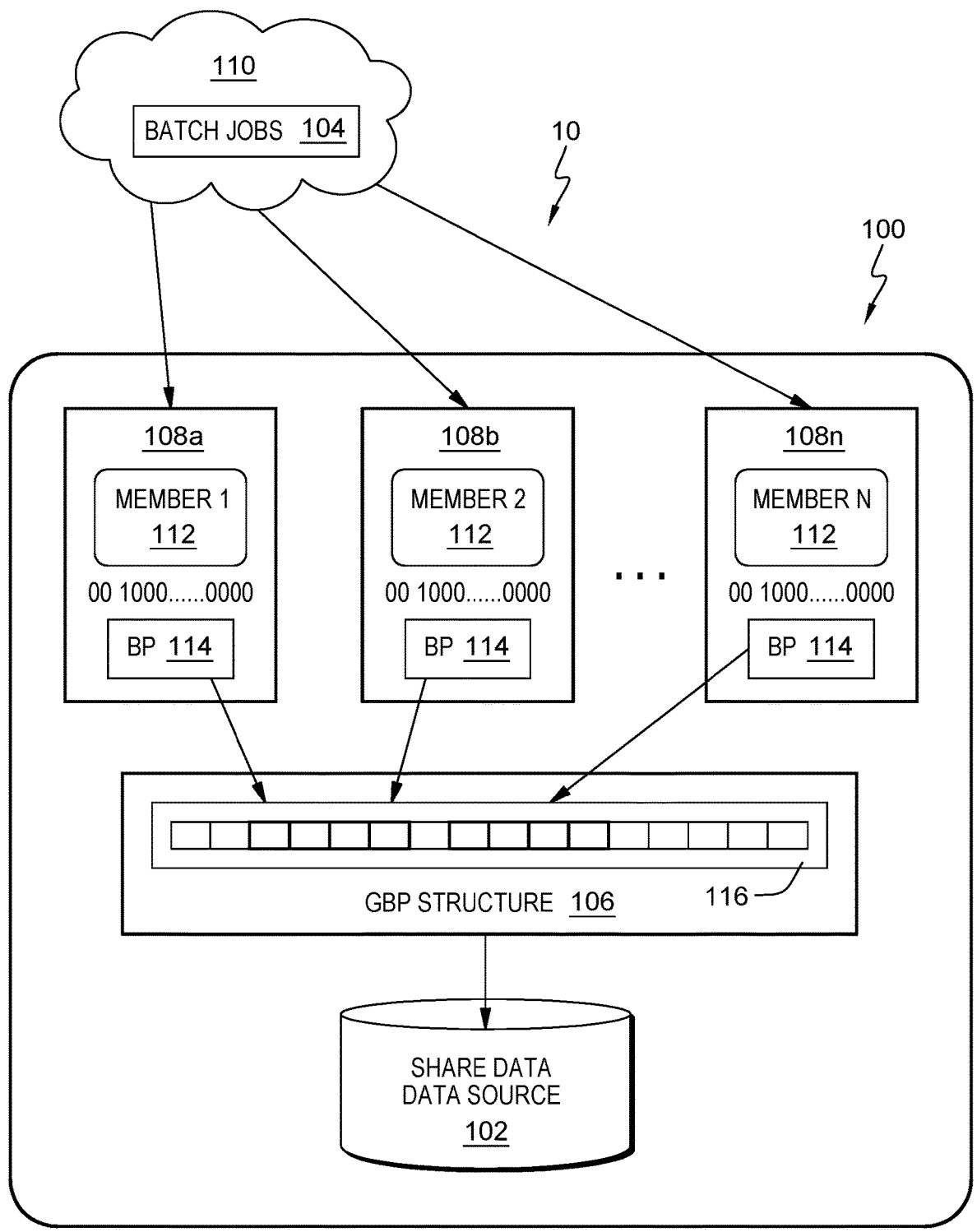
FIG. 1 depicts a functional block diagram illustrating a database system environment, in accordance with an embodiment of the present invention.

Software engineers can configure computer applications to manipulate data in databases by writing and executing code, such as a Structured Query Language (SQL). A database can take SQL code and generate an access path that describes how to access the data specified in the SQL. More specifically, the database can use statistics about the data stored within to generate the access path. The database can periodically run utilities that collect and store these statics within the database. For example, a RUNSTATS utility can collect and store histograms documenting the tables and indices of a database. However, collecting and storing these statistics can consume a relatively large number of resources. Further, because these statistics are generated on a periodic basis, the statistics may not reflect the real-time state of the database. Tables, indices, and other database elements can change continually. As such, in some scenarios, the access path generated for a particular SQL may not represent an efficient way to access data if there are enough changes between the time the statistics are collected and the time the access path is executed.

Additionally, database utilities may not collect statistics for volatile tables. Volatile tables can include temporary data that is generated by a running computer application and deleted after the computer application finishes. For example, SQL commands, such as JOIN, GROUP BY, and ORDER BY can use volatile tables to hold data temporarily while the computer application is running. However, access paths can be generated before computer applications begin running. As such, there may not be any relevant statistics available to generate an access path for volatile tables. Thus, accesses to volatile tables may be inefficient.

Accordingly, embodiments of the present disclose can provide efficient read/write for SQL in databases utilizing multiple members to run parallel processes. For example, considering the batch jobs that have an internal object relationship, the object may keep different isolation levels for different jobs. To maintain the different isolation levels, a single major job can sometimes require the remaining jobs to wait until the major job finally completes the read/write function. If this major job experiences an exception that requires a re-run, all batch jobs must rerun again as well. These delays reduce the overall potential performance of the database system. Another typical customer case is when batch jobs are received by the database system as part of a night maintenance routine, and the database system receives an online transaction. These transaction may only occur occasionally, but the occurrence makes the dependency decrease the performance of the whole set of batch jobs.

In some embodiments, users can train a machine learning module to identify a relationship between real-time statistics (RTS) about the database and access paths that can be efficiently executed against the database. Real-time statistics can represent dynamic changes to the database, including how many rows have been inserted, deleted, and otherwise updated since the last periodic update of the database statistics. Accordingly, as data is inserted and deleted from tables during execution of a computer application, the database can use this machine learning module to select an access path based on RTS that represent how data in the database has changed in real time. In this way, efficient access paths can be selected and executed even when accessing data in a dynamic database, and volatile tables. Efficiency of following a specific access path can be determined according to multiple variables, such as, the processing time involved, the number of steps in scanning a table or index, the amount of memory involved, and the like. Thus, for example, if an efficiency evaluation is based on the number of steps, the access path that uses the relatively fewest steps of the generated access paths may be selected for run-time execution. According to some embodiments of the present disclosure, the efficiency evaluation can be learned by training a machine learning model.

The present invention will now be described in detail with reference to the Figures. FIG. 1 depicts a functional block diagram illustrating a database system environment 10, in accordance with an embodiment of the present invention. The database system environment 10 includes a database system 100 that stores information in a data source 102. The database system 100 may be a relational database using tables of columns and rows, and may also include other database types such as NoSQL or non-relational databases. The information may include items such as tables containing rows and columns of information, for future references by external users and applications. The database system 100 receives a batch job 104 (e.g., predicate, structured query language (SQL) statement, request, activity, process) from an external user or application, and the database system 100 accesses the data source 102 through the use of a group buffer pool (GBP) structure 106 and a node members 108a, b, n.

The node members 108a, b, n are connected via a network 110. The node members 108a, b, n can be desktop computers, laptop computers, specialized computer servers, or any other computer systems known in the art. In certain embodiments, the node members 108a, b, n represent computer systems utilizing clustered computers and components to act as a single pool of seamless resources when accessed through network 110. For example, such embodiments may be used in data center, cloud computing, storage area network (SAN), and network attached storage (NAS) applications. In certain embodiments, the node members 108a, b, n represent virtual machines. In general, the node members 108a, b, n are representative of any electronic devices, or combination of electronic devices, capable of executing machine-readable program instructions, in accordance with an embodiment of the present invention, as described in greater detail with regard to FIG. 5.

The network 110 can be, for example, a local area network (LAN), a wide area network (WAN) such as the Internet, or a combination of the two, and include wired, wireless, or fiber optic connections. In general, the network 110 can be any combination of connections and protocols that will support communications between the node members 108a, b, n and the devices submitting the batch jobs 104, in accordance with an embodiment of the invention.

The node members 108a, b, n represent platforms in the database system 100 that allocate resources to perform the batch jobs 104. In this embodiment, the node members 108a, b, n may include "n" number of the node members 108a, b, n, as illustrated by the node members 108a, b, n, where the cluster of the node members 108a, b, n are viewed as a single computer system managed by the database system 100. For example, a computer cluster in database environment 10 can include "n" number of the node members 108a, b, n, where "n" is the node members 108a, b, n (e.g., the node members 108a, b, n a-j, not depicted).

The node members 108a, b, n may include managers 112 that manage the batch jobs 104 from the network 110 for one or more resources to perform distributed computing tasks. In this embodiment, managers 112 are configured to allocate memory resources including a buffer pool 114. The managers 112 may also take advantage of a group buffer pool (GBP) 116. The buffer pool may be a portion of a main memory space which is allocated by the database manager. The purpose of buffer pools is to cache table and index data from disk. All databases have their own buffer pools. A default buffer pool is created at the time of creation of new database. It called as "IBMDEFAULTBP". Depending on the user requirements, it is possible to create a number of buffer pools. In the buffer pool, the database manager places the table row data as a page. This page stays in the buffer pool until the database is shutdown or until the space is written with new data. The pages in the buffer pool, which are updated with data but are not written onto the disk, are called "Dirty" pages. After the updated data pages in the buffer pool are written on the disk, the buffer pool is ready to take another data. The managers 112 address the batch jobs 104 by interacting (e.g., reading or writing) with information within the database system 100. The fast and least resource intensive location for information is the buffer pool 114 located on each node member 108. When the buffer pool 114 is full, the managers 112 interact with information on the GBP 116. If the batch job 104 is directed at information that is not on the buffer pool 114 or the GBP 116, the managers 112 will request the information from the data source 102. The exchange between the buffer pool 114 and the GBP 116 or the data source 102, however, is relatively slower. Thus, the managers 112 may perform a process to enforce single-write batch processes for objects when handling read/write dependencies.

The managers 112 may represent virtual machines to perform tasks for an individual application and store output data. For example, the managers 112 are spawned and managed by manager the database system 100. The managers 112 may be configured to perform all tasks for certain applications. In another example, the managers 112 may be isolated from each other, which may be beneficial for scheduling tasks for each application and beneficial for managing tasks for each of manager processes. However, because certain applications are typically considered isolated, data for each application may not be shared without writing the data to an external storage system (e.g., data source 102). In contrast, in this embodiment, global metadata and additional processing information is available as a shared variable area, such that applications are no longer isolated.

The buffer pools 114 and the GBP 116 represent computer-readable storage media for the node members 108a, b, n, respectively. In certain embodiments, each memory includes random access memory (RAM) and cache memory. In general, a memory can include any suitable volatile or non-volatile computer-readable storage media that can store data while its respective manager process performs tasks.

Figure 2:
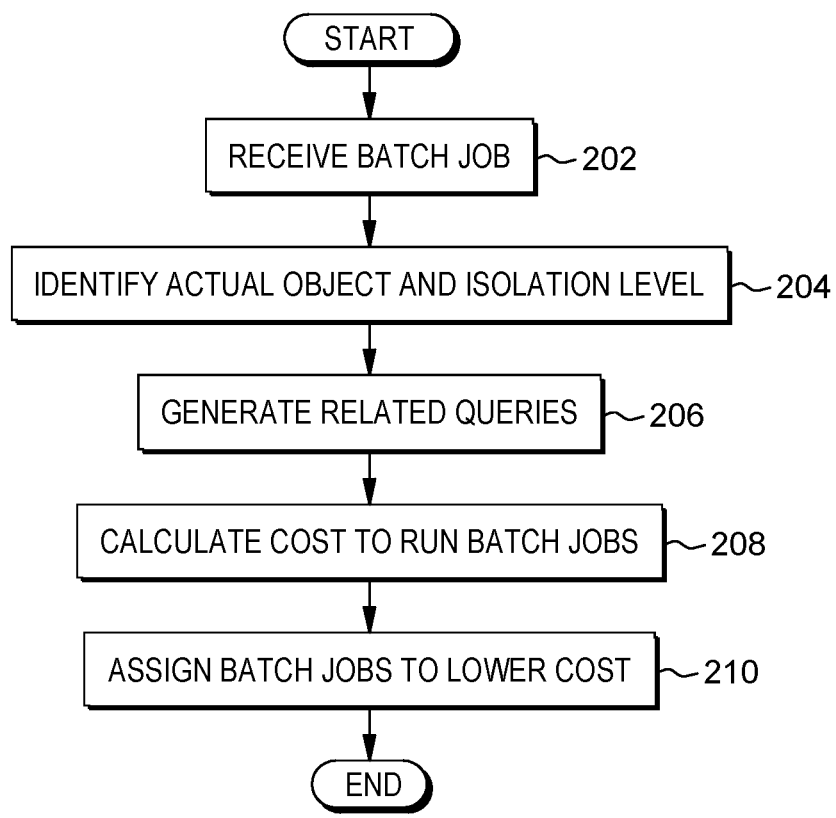
FIG. 2 is a flowchart depicting operational steps of an operation module included in the worker node of FIG. 1, in accordance with an embodiment of the present disclosure.

FIG. 2 depicts a flowchart showing operational procedures of the database system 100, in accordance with an embodiment of the present invention. The database system 100 receives a batch job 104 through the network 110 (block 202). The batch jobs 104 may include transaction analytic, queries, object relationships, or other factors that indicate an interaction with a specific object within the data source 102. The object may be stored on one or more of the buffer pools 114, or the GBP 116. The database system 100 may also normalize the batch job 104 to reduce the required resources and to decrease the size of the calculations required. For example, the database system 100 may remove specific values from the batch job 104 and conduct a more generalized interaction with the data source 102. The database system 100 may also remove additional functions from the batch job 104. Removing the additional functions could mean that the batch job 104 does not include partition related items. The database system 100 may also rewrite the batch job 104 as a query parsing subquery, alias, view, or other change.

The database system 100 may also identify a first actual object and an isolation level for the batch job 104 (block 204). The batch job 104 in certain embodiments specifies an isolation level for the data source 102. The isolation level specifies how transactions that modify the database are handled. By default, the default object gateway is used. Some database vendors use different names for the isolation levels, but the database system 100 is configured to identify all isolation levels for the database type. Queries that are executed by reports and analysis are intended to be read-only operations. The queries execute with a unit of work at the data source known as a transaction with either a default or administrator-defined isolation level. Report authors should not assume that queries that execute stored procedures commit any data written by the procedure. In some environments, changes made by a procedure may be committed due to features of the database. When the database system 100 receives specific queries to run with different isolation levels, the database system 100 is able to define different database connections. For example, the database system 100 may receive a query such as:

```
SELECT S.* FROM
(SELECT r_name, n_name, p_name, SUM(o_totalprice) AS s_SALES ,
SUM(SUM(o_totalprice)) OVER (PARTITION BY r_name ) s1,
SUM(SUM(o_totalprice)) OVER (PARTITION BY r_name, n_name) s2,
RANK( ) OVER (PARTITION BY r_name, n_name ORDER BY
SUM(O_TOTALPRICE) DESC) rank FROM CUSTOMER, PART,
LINEITEM, ORDER, NATION, REGION
WHERE O_CUSTKEY = C_CUSTKEY AND C_NATIONKEY =
N_NATIONKEY AND L_PARTKEY = P_PARTKEY AND O_ORDERKEY
= L_ORDERKEY AND N_REGIONKEY = R_REGIONKEY AND
C_NATIONKEY = 1 GROUP BY R_NAME, N_NAME, P_NAME ) S
WHERE s2 >= 0.25 * s1 AND rank <= 10
```

The query includes statements that with different types and functions, with the total organization working together to create one coherent statement. In identifying the actual object, the database system 100 may include some suppositions. For example, if a first batch job and a second batch job are defined as a special data type, the database system 100 may generate common queries such as: #1: SELECT C1 FROM T.

Figure 3:
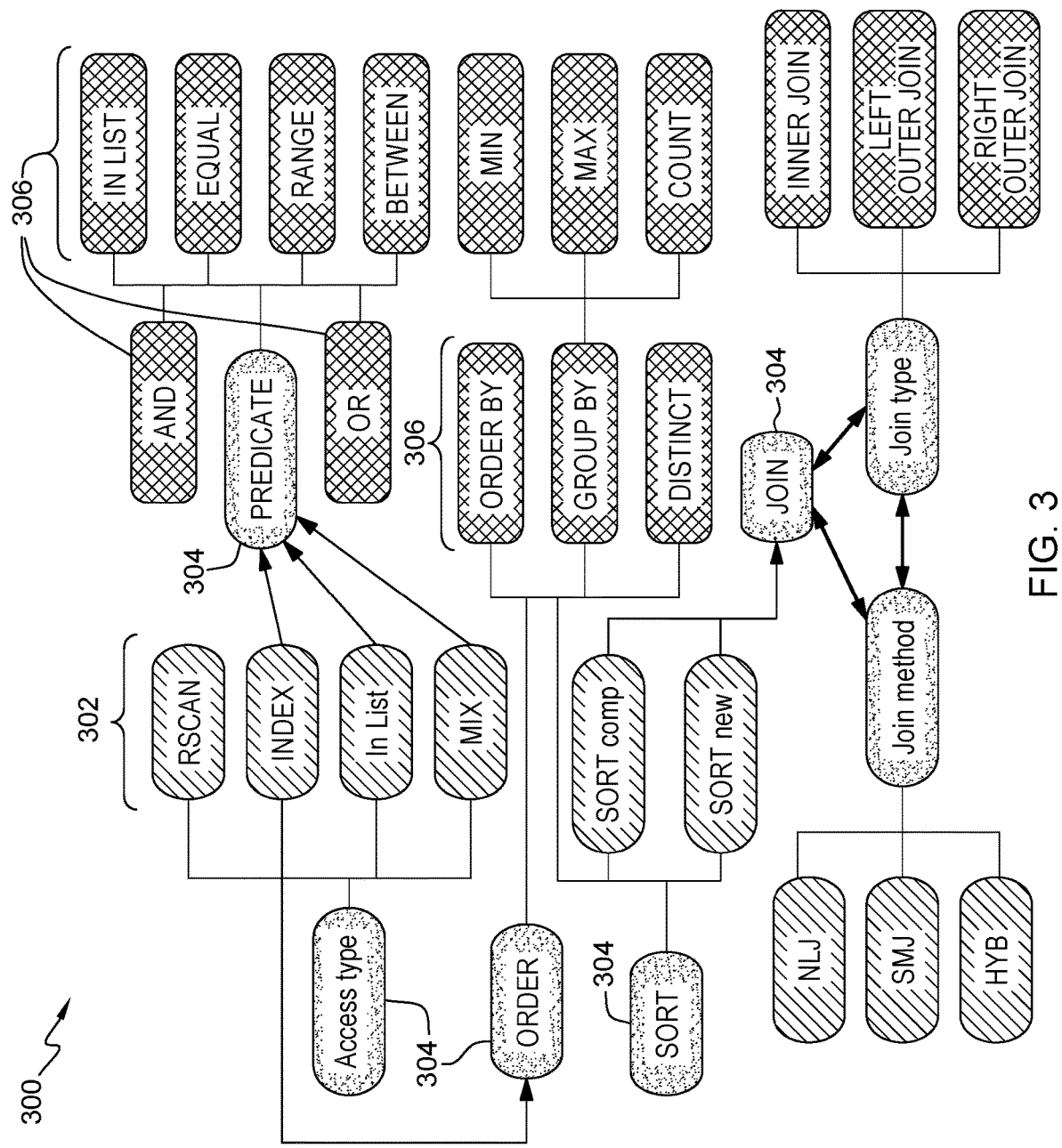
FIG. 3 depicts a block diagram representing a knowledge map for the generation of additional queries, in accordance with an embodiment of the present disclosure.

The database system 100 may also utilize a knowledge map. FIG. 3 depicts a block diagram representing a knowledge map 300 for the generation of additional queries, in accordance with an embodiment of the present disclosure. The knowledge map 300 may be based on rules and imported to the database system 100 from another training module or system. In certain embodiments, the database system 100 trains a clustering machine learning module or general analytics statistical method to detect the topics 302, and the relationships 304 between keywords 306 and topics 302. The database system 100 can then calculate correlated ratios of correlated topics, and calculate query clauses based on relevance between topics 302, relationships 304, and keywords 306.

Figure 4:
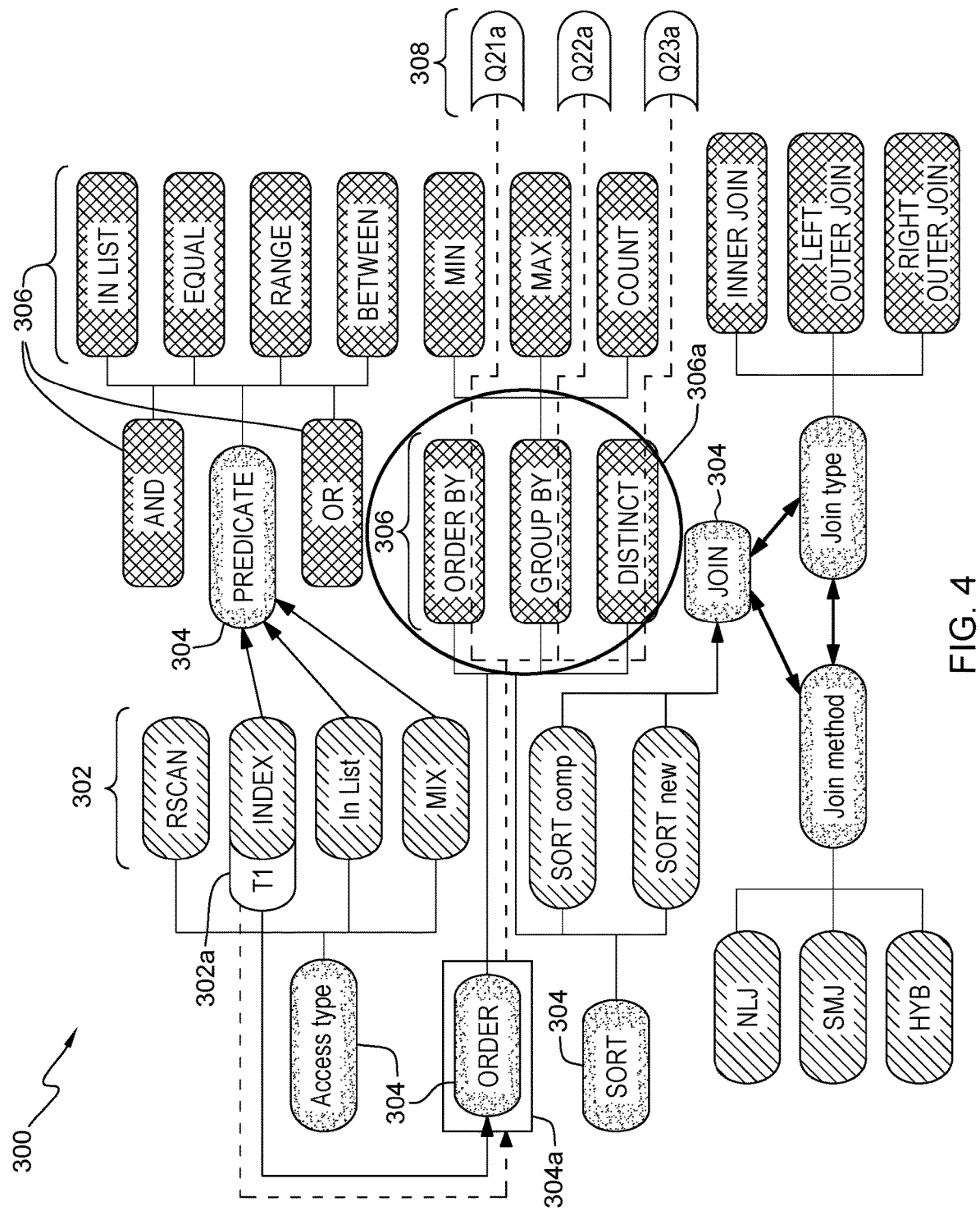
FIG. 4 depicts a block diagram representing the knowledge map of FIG. 3, in accordance with an embodiment of the present disclosure.
Figure 5:
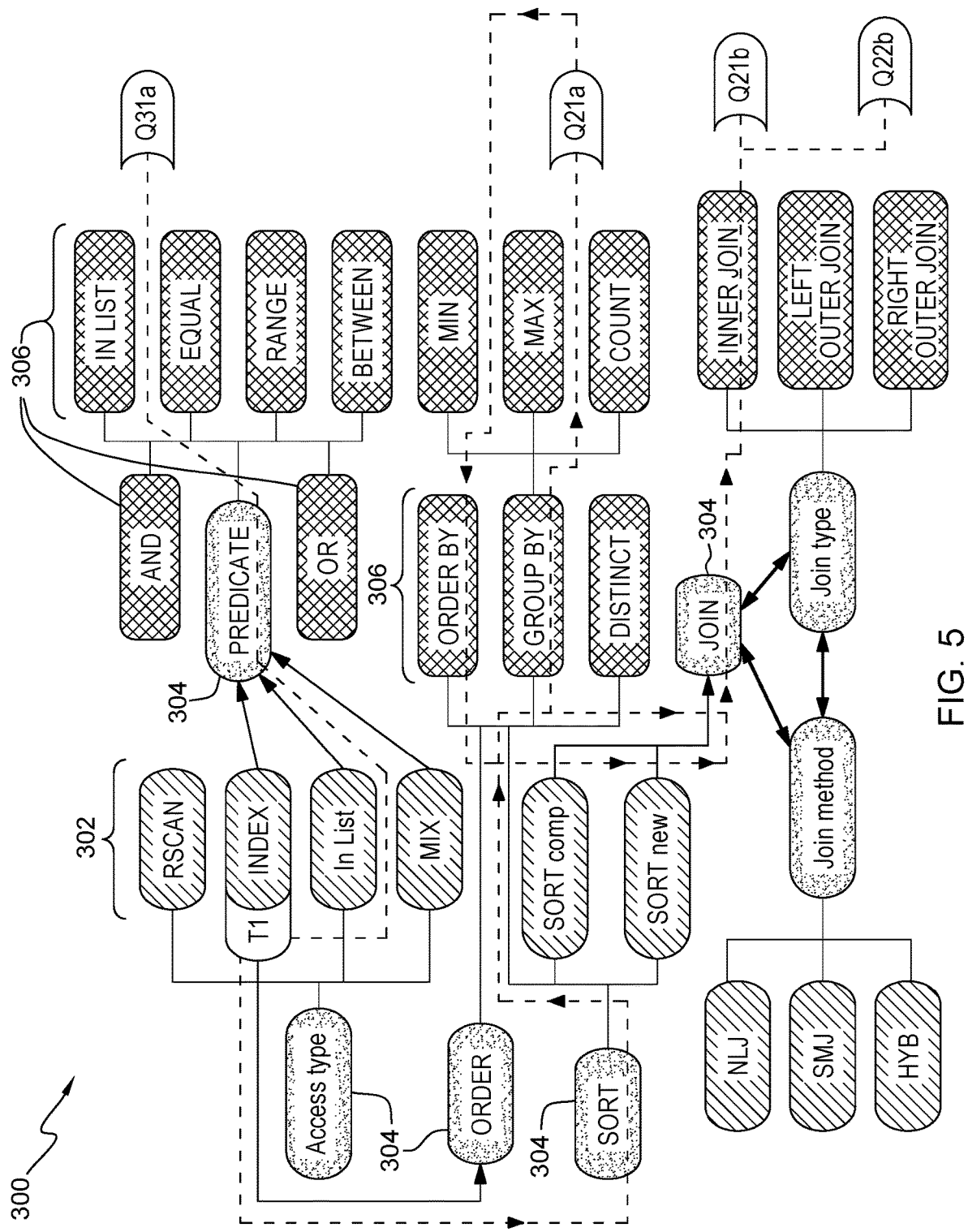
FIG. 5 depicts a block diagram representing the knowledge map of FIG. 3, in accordance with an embodiment of the present disclosure.

The database system 100 may also generate related queries based on the first actual object and the isolation level (block 206). With the knowledge map 300 the database system 100 can expand the number and types of queries based on the keywords 306 of the batch job 104. FIG. 4 depicts the knowledge map 300 representing generation of additional queries, in accordance with an embodiment of the present disclosure. For example, the database system 100 use the topic 302—"INDEX" as a first topic 302a to generate additional queries. Using the knowledge map 300, the database system 100 expands on similar keywords 306 to generate the additional queries. That is, the database system 100 determines that relationships 304 'PREDICATE' and 'ORDER' are topics that have a strong correlation with topic 302 'INDEX.' This relationship triggers two routes to detect keywords of query clauses, and we can generate queries based on the keywords. In the first relationship 304a—"ORDER," we can find first keywords 306a—GROUP BY, ORDER BY, DISTINCT are under the topic, then query#1 can be evolved to additional queries 308 which including these keywords 306:
21a: SELECT C1 FROM T ORDER BY C2;
22a: SELECT C1 FROM T GROUP BY C2;
23a: SELECT DISTINCT(C1) FROM T;

The database system 100 may also get queries based on keywords 306 which are under a header topic 302. FIG. 5 depicts the knowledge map 300 representing generation of additional queries, in accordance with an embodiment of the present disclosure. Continuing with the example topic 302a of "INDEX," under the relationship 304 "ACCESS TYPE," so the database system 100 checks other relationships 304 which are subcategorized under the given topic 302a. If there is significant relevance between INDEX and "IN LIST," for example, the database system 100 generates queries base on the topic 302 IN LIST. Such additional queries may include:
31a: SELECT T.C1 FROM T INNER JOIN T2 ON T.C3=T2.C3 WHERE T.C4 IN (3, 6, 8) GROUP BY T.C1;

From another side, the database system 100 may repeat additional queries 308 using different relationships 304 or keywords 306. For example, the keyword 306 "GROUP BY" is under the relationship 304 "SORT." The database system 100 may generate the additional query #21a based on this topic 302. In this way, the database system 100 is able to expand the number and types of queries, generating more evolved queries such as:
21b: SELECT T.C1 FROM T INNER JOIN T2 ON T.C3=T2.C3 GROUP BY T.C1;
22b: SELECT T.C1 FROM T INNER JOIN T2 ON T.C3=T2.C3 ORDER BY T.C1;

The database system 100 may then calculate the cost to run the batch jobs 104 on the node members 108 based on the additional queries 308 (block 208). For example, the database system 100 may use the previous query sub block to help identify complex queries in high performance database operations. As previous query object identification update object information with the generating query, the database system 100 analyzes and updates statements with same process. The database system 100 also identifies write objects for the batch jobs 104, and groups the batch jobs 104 with write objects features. Calculating the cost may include a determination of costs such as: input/output cost, computer processing unit (CPU) useage, a first exchange cost between a group buffer pool and the first buffer pool, and a second exchange cost between the group buffer pool and the second buffer pool.

The database system 100 may then assign the batch jobs to the node member 108 that has the lower cost (block 210). Assigning the batch jobs to the node member 108 may include grouping additional jobs with the batch jobs 104 based on a relationship between the additional jobs and the first actual object. The database system 100 may assign the new transaction to member which has most low impact with dependency.

Figure 6:
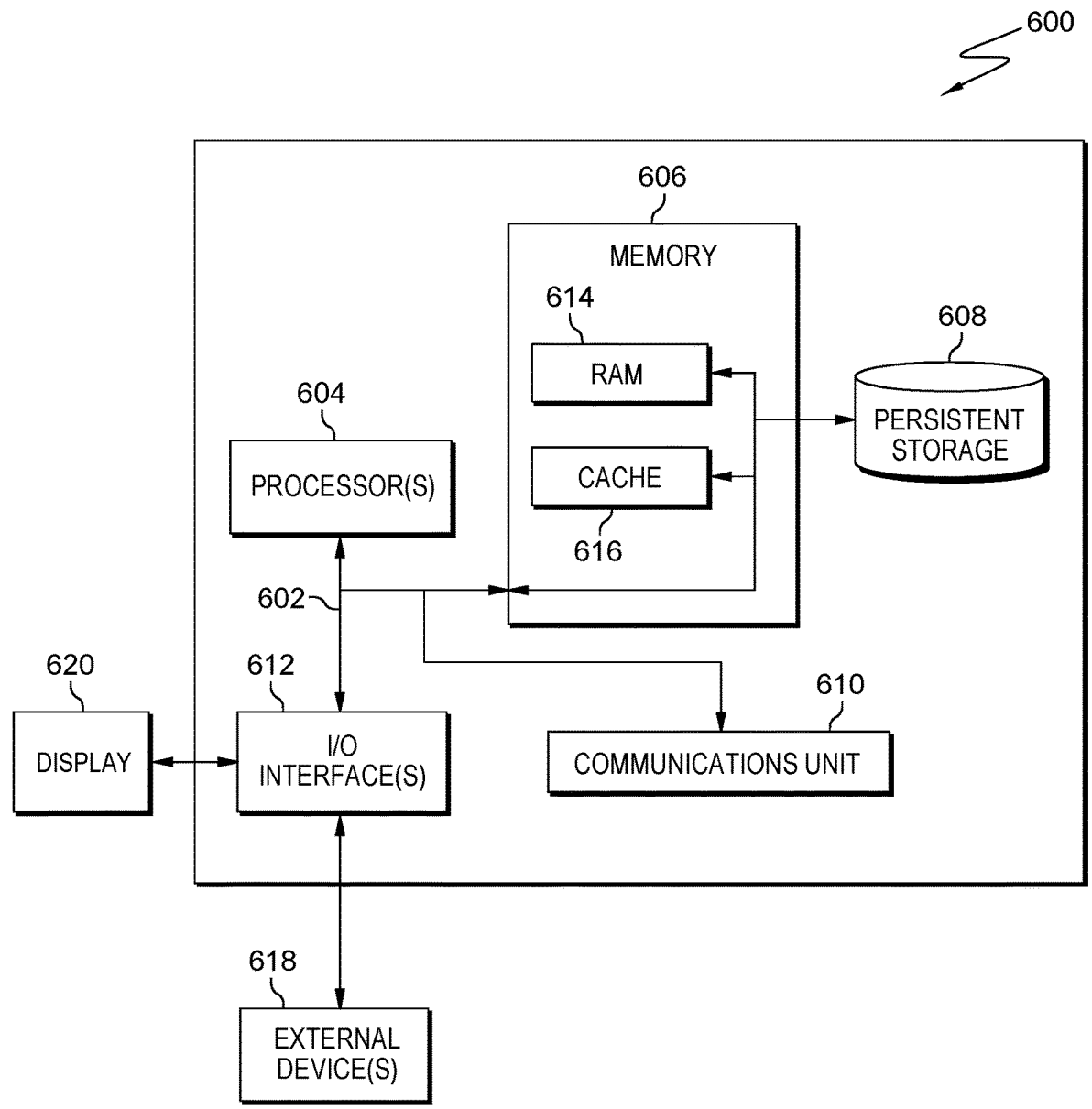
FIG. 6 is a block diagram of components of the database system, in accordance with an embodiment of the present invention.

FIG. 6 depicts a block diagram of components of the database system 100 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

The database system 100 includes communications fabric 602, which provides communications between RAM 614, cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

The managers 112 may be stored in persistent storage 608 and in memory 606 for execution and/or access by one or more of the respective computer processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 510 may provide communications through the use of either or both physical and wireless communications links. The performance simulation system 120 may be downloaded to persistent storage 608 through communications unit 610.

I/O interface(s) 612 allows for input and output of data with other devices that may be connected to server computer. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention (e.g., the performance simulation system 120) can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for improving performance of a database, comprising:
    receiving a batch job for a relational database comprising (i) a first member comprising a first buffer pool and (ii) a second member comprising a second buffer pool;
    identifying a first actual object and an isolation level for the batch jobs;
    generating related queries, each related query comprising a word related to but distinct from words in the batch job, wherein each related query is based on the first actual object and the isolation level;
    calculating a resource cost for each of the first member and the second member to run the batch jobs based on the related queries; and
    assigning the batch jobs to the first member based on a lower calculated resource cost.

2. The method of claim 1, further comprising normalizing the batch job.

3. The method of claim 2, wherein normalizing the batch job comprises a selection from the group consisting of removing specific values, removing additional function, and parsing a subquery.

4. The method of claim 1, wherein the related queries are based on a knowledge map comprising keywords, topics, and relationships between the keywords and the topics that are correlated by a machine learning process.

5. The method of claim 1, wherein generating the related queries comprises determining keywords related to the first actual object, wherein the keywords are not written in the batch jobs.

6. The method of claim 1, further comprising grouping additional jobs with the batch jobs based on a relationship between the additional jobs and the first actual object.

7. The method of claim 1, wherein the resource cost is selected from the group consisting of: input/output cost, a first exchange cost between a group buffer pool and the first buffer pool, and a second exchange cost between the group buffer pool and the second buffer pool.

8. A computer program product comprising:
one or more computer readable storage media, and program instructions collectively stored on the one or more computer readable storage media, the program instructions comprising:
program instructions to receive batch jobs for a relational database comprising (i) a first member comprising a first buffer pool, and (ii) a second member comprising a second buffer pool;
program instructions to identify a first actual object and an isolation level for the batch jobs;
program instructions to generate related queries, each related query comprising a word related to but distinct from words in the batch job, wherein each related query is based on the first actual object and the isolation level;
program instructions to calculate a cost for the first member and the second member to run the batch jobs based on the related queries; and
program instructions to assign the batch jobs to the first member based on a lower calculated cost.

9. The computer program product of claim 8, further comprising program instructions to normalize the batch jobs.

10. The computer program product of claim 9, wherein normalizing the batch jobs comprises a selection from the group consisting of removing specific values, removing additional function, and parsing a subquery.

11. The computer program product of claim 8, wherein the related queries are based on a knowledge map comprising keywords, topics, and relationships between the keywords and the topics that are correlated by a machine learning process.

12. The computer program product of claim 8, wherein the program instructions to generate the related queries comprise program instructions to determine keywords related to the first actual object, wherein the keywords are not written in the batch jobs.

13. The computer program product of claim 8, further comprising program instructions to group additional jobs with the batch jobs based on a relationship between the additional jobs and the first actual object.

14. The computer program product of claim 8, wherein calculating the cost comprises a selection from the group consisting of: input/output cost, a first exchange cost between a group buffer pool and the first buffer pool, and a second exchange cost between the group buffer pool and the second buffer pool.

15. A computer system comprising:
one or more computer processors, one or more computer readable storage media, and program instructions collectively stored on the one or more computer readable storage media for execution by at least one of the one or more computer processors, the program instructions comprising:
program instructions to receive batch jobs for a relational database comprising (i) a first member comprising a first buffer pool, and (ii) a second member comprising a second buffer pool;
program instructions to identify a first actual object and an isolation level for the batch jobs;
program instructions to generate related queries, each related query comprising a word related to but distinct from words in the batch job, wherein each related query is based on the first actual object and the isolation level;
program instructions to calculate a cost for the first member and the second member to run the batch jobs based on the related queries; and
program instructions to assign the batch jobs to the first member based on a lower calculated cost.

16. The computer system of claim 15, further comprising program instructions to normalize the batch jobs.

17. The computer system of claim 15, wherein the related queries are based on a knowledge map comprising keywords, topics, and relationships between the keywords and the topics that are correlated by a machine learning process.

18. The computer system of claim 15, wherein the program instructions to generate the related queries comprise program instructions to determine keywords related to the first actual object, wherein the keywords are not written in the batch jobs.

19. The computer system of claim 15, further comprising program instructions to group additional jobs with the batch jobs based on a relationship between the additional jobs and the first actual object.

20. The computer system of claim 15, wherein calculating the cost comprises a selection from the group consisting of: input/output cost, a first exchange cost between a group buffer pool and the first buffer pool, and a second exchange cost between the group buffer pool and the second buffer pool.

* * * * *